United States Patent
Shin et al.

(10) Patent No.: US 7,641,883 B2
(45) Date of Patent: Jan. 5, 2010

(54) METHOD FOR SEPARATING CARBON NANOTUBES, METHOD FOR DISPERSING CARBON NANOTUBES AND COMPOSITIONS USED FOR THE METHODS

(75) Inventors: Hyeon Jin Shin, Suwon-si (KR); Seonmi Yoon, Yongin-si (KR); Jaeyoung Choi, Suwon-si (KR); Seong Jae Choi, Seoul (KR); YoungHee Lee, Suwon-si (KR); JungJun Bae, Seogwipo-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/062,613

(22) Filed: Apr. 4, 2008

(65) Prior Publication Data

US 2009/0041652 A1   Feb. 12, 2009

(30) Foreign Application Priority Data

Jul. 5, 2007   (KR) .................. 10-2007-0067410

(51) Int. Cl.
*D01F 9/12*     (2006.01)
*B03B 1/04*     (2006.01)
*B01D 11/04*    (2006.01)
*H01B 1/04*     (2006.01)

(52) U.S. Cl. .............. 423/447.1; 252/502; 252/510; 977/751; 977/895

(58) Field of Classification Search .......... 423/447.1, 423/445 R; 252/502, 510; 977/751, 895
See application file for complete search history.

(56) References Cited

U.S. PATENT DOCUMENTS

2004/0038251 A1    2/2004   Smalley et al.
2008/0297878 A1*  12/2008   Brown et al. ............. 359/263

FOREIGN PATENT DOCUMENTS

| JP | 2007031238 | 2/2007 |
|---|---|---|
| KR | 1020060077578 A | 7/2006 |
| KR | 1020070018588 A | 2/2007 |
| KR | 10-2007-0049116 | 5/2007 |

OTHER PUBLICATIONS

Marc Wirtz et al., Template-Fabricated Gold Nanowires and Nanotubes, Advanced Materials, vol. 15, No. 5, Mar. 4, 2003, pp. 455-458.
Korean Office Action dated Apr. 8, 2009; Application No. 10-2007-0067410 (with English translation).

* cited by examiner

*Primary Examiner*—Wayne Langel
*Assistant Examiner*—Syed Iqbal
(74) *Attorney, Agent, or Firm*—Cantor Colburn LLP

(57) ABSTRACT

The separation of carbon nanotubes into metallic carbon nanotubes and semiconducting carbon nanotubes is made to be possible simultaneously with the dispersion of the carbon nanotubes by using viologen.

15 Claims, 9 Drawing Sheets

Polar | Non-polar

Non-polar solvent (Reduced viologen)

Water (Oxidized viologen)

METHOD FOR SEPARATING CARBON NANOTUBES, METHOD FOR DISPERSING CARBON NANOTUBES AND COMPOSITIONS USED FOR THE METHODS

This application claims priority to Korean Patent Application No. 10-2007-0067410, filed on Jul. 5, 2007, and all the benefits accruing therefrom under 35 U.S.C §119, the contents of which in its entirety are hereby incorporated by reference.

BACKGROUND OF THE INVENTION

The disclosure relates to a method of separating carbon nanotubes, a method of dispersing carbon nanotubes and compositions for these methods.

Carbon nanotube ("CNT") is a material in which carbon atoms are connected with each other in a hexagonal honeycomb shape so as to form a tube shape. A diameter of the tube is generally within a range of nanometers (1 nm=$10^{-9}$ m). The energy gap of CNT varies with its diameter.

CNT's have highly anisotropic properties, and can exist in the form of single wall nanotubes that undergo roping, multi-wall nanotubes, and the like. Further, CNT's have excellent mechanical properties and electrical conductivity, useful electric field emission properties, and a high hydrogen storage efficiency, and the like.

CNT's exhibit semiconducting or metallic property, depending upon the arrangement of the hexagonal carbon honeycombs.

Several methods can be used to produce carbon nanotubes. These are an arc-discharge method, a thermal decomposition method, a laser vaporization method, a plasma chemical vapor deposition method, a thermal chemical vapor deposition method and an electrolysis method.

BRIEF SUMMARY

Disclosed herein is a method for separating carbon nanotubes, comprising manufacturing a solution comprising viologen, carbon nanotubes, water and non-polar solvent.

Disclosed too herein is a method for dispersing carbon nanotubes, comprising manufacturing a solution comprising viologen, carbon nanotubes and a solvent comprising water, a non-polar solvent or a combination of water and the non-polar solvent.

Disclosed herein too is a composition for separating carbon nanotubes, comprising a solution of viologen, carbon nanotubes and a solvent comprising water and non-polar solvent.

Disclosed herein too is a composition for dispersing carbon nanotubes, comprising a solution of viologen, carbon nanotubes and a solvent comprising water, a non-polar solvent or a combination of water and the non-polar solvent.

BRIEF DESCRIPTION OF THE DRAWINGS

FIG. 5b is a graph in which background values are removed in the UV-Vis-NIR spectrum of FIG. 5a.

DETAILED DESCRIPTION OF THE EMBODIMENTS

Figure 1A:
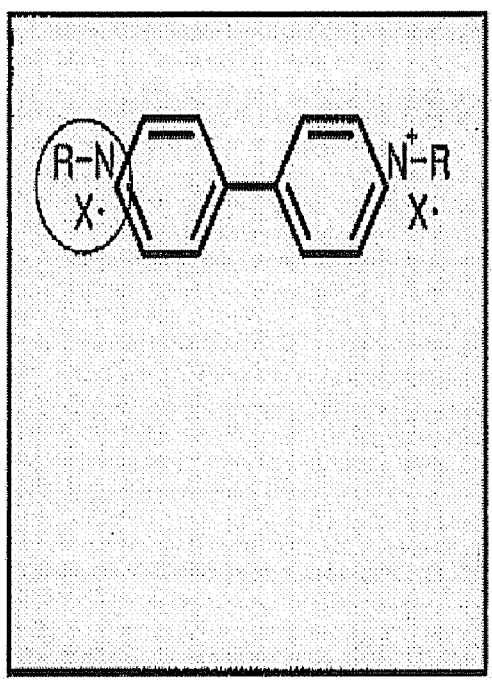
FIG. 1a shows a polarity change according to oxidation and reduction of viologen.
Figure 1A:
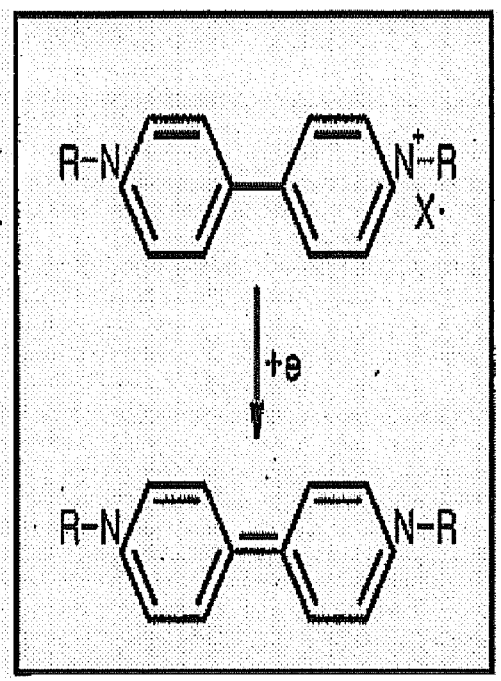

Hereinafter, disclosed embodiments will now be described more fully with reference to the accompanying drawings, in which exemplary embodiments are shown.

The terminology used herein is for the purpose of describing particular embodiments only and is not intended to be limiting of the invention. As used herein, the singular forms "a", "an" and "the" are intended to include the plural forms as well, unless the context clearly indicates otherwise. The use of the terms "first", "second", and the like do not imply any particular order but are included to identify individual elements. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements.

Viologen is a derivative of 4,4'-bipyridyl, which is a compound having diquartemary amines. Viologen exhibits polarity or non-polarity when it is oxidized or reduced respectively. That is, as illustrated in FIG. 1a, viologen shows non-polarity if it receives an electron and is thus reduced. On the contrary, viologen shows polarity if it loses an electron and is thus oxidized.

Figure 1B:
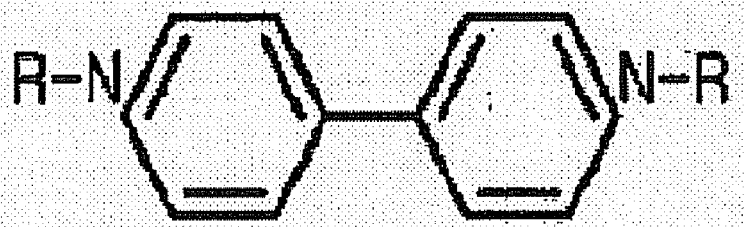
FIG. 1b shows oxidized and reduced viologens respectively together with solvent.
Figure 1B:
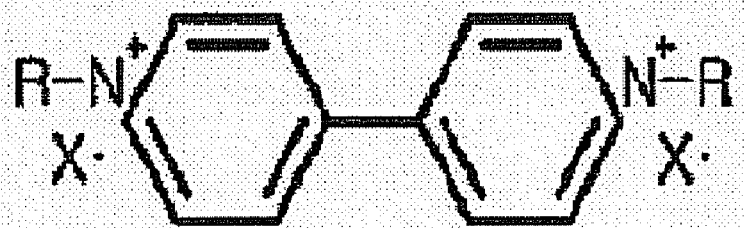

As schematically illustrated in FIG. 1b, the reduced non-polar viologen has an affinity for non-polar solvents and the oxidized polar viologen has an affinity for polar solvent such as water.

Further, when viologen is added to carbon nanotubes, metallic carbon nanotubes being electron-rich lose an electron to the viologen, which acts to reduce the viologen, while, on the other hand, semiconducting carbon nanotubes relatively attract an electron from the viologen, thereby oxidizing the viologen.

Thus, the metallic carbon nanotubes, along with the reduced viologen, have an affinity for non-polar solvent. Further, the semiconducting carbon nanotubes, along with the oxidized viologen, have an affinity for water.

Figure 1C:
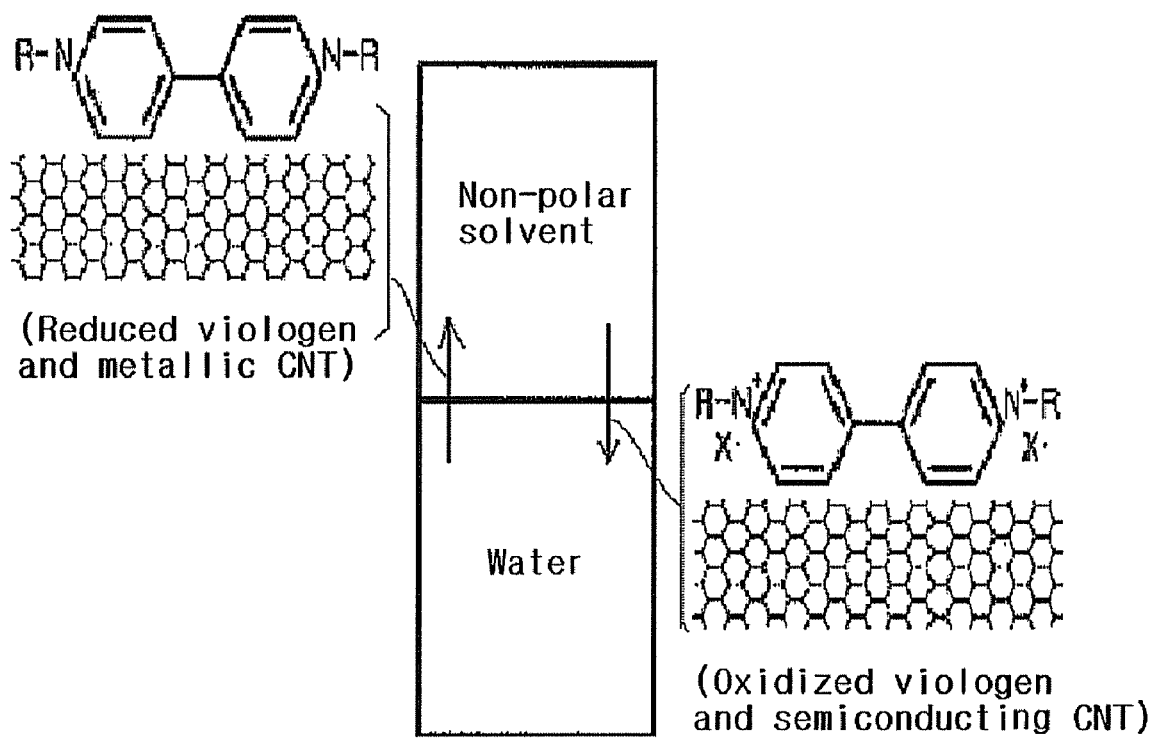
FIG. 1c schematically shows separation behaviors of metallic carbon nanotubes and semiconducting carbon nanotubes in water and non-polar solvent.

Therefore, as illustrated in FIG. 1c, if a phase separation is performed for a solution containing carbon nanotubes, viologen, polar solvent such as water and non-polar solvent, the carbon nanotubes can separated into semiconducting carbon nanotubes and metallic carbon nanotubes. In other words, the semiconducting carbon nanotubes moves along with the oxidized viologen towards the water (polar solvent) and the metallic carbon nanotubes moves along with the reduced viologen towards the non-polar solvent, as shown in FIG. 1c.

That is, the carbon nanotubes can be separated into the metallic carbon nanotubes and semiconducting carbon nanotubes using the oxidation and reduction of viologen.

In another embodiment, the viologen is used to improve dispersibility of the carbon nanotubes.

More specifically, the viologen is added to a solution comprising the carbon nanotubes and solvent in order to increase dispersibility of the carbon nanotubes in the solvent. For example, in case of where the carbon nanotubes are semiconducting carbon nanotubes, water (polar solvent) can be used as solvent.

Further, if the carbon nanotubes are metallic carbon nanotubes, non-polar solvent can be used.

In case that the viologen is added to carbon nanotubes, π-π interactions can be formed between the carbon nanotubes and an aromatic ring of the viologen. The interaction can be stronger as electron transfer occurs between the carbon nanotubes and the viologen. Such interaction improves the dispersibility between the respective carbon nanotubes. Further, as the interaction becomes stronger according to the electron transfer, the dispersibility can be increased more.

Carbon nanotubes are generally manufactured and exist in the form of bundles generally known as agglomerates form. By dispersing the carbon nanotubes, i.e., by separating them from the bundles and dispersing them individually in a matrix, excellent mechanical and electrical properties of the carbon nanotubes can be obtained in the matrix as well as for the composite.

As described above, by using viologen, the separation of the carbon nanotubes is achieved, simultaneously while improving dispersibility of the carbon nanotubes.

The separated and/or well-dispersed carbon nanotubes have a variety of applications.

For example, the separated and/or dispersed metallic carbon nanotubes can be coated on a display device so as to form a transparent and conductive electrode. The metallic carbon nanotubes can be applied to fabricate an electrode of a solar cell. The separated and/or dispersed semiconducting carbon nanotubes can be used to fabricate a transistor device.

In one embodiment, a method of separating carbon nanotubes at least into metallic carbon nanotubes and semiconducting carbon nanotubes comprises a step of forming a solution containing carbon nanotubes, viologen, water (polar solvent) and non-polar solvent. Hereinafter, for convenience of explanation, the method will be explained, illustrating water as a polar solvent.

In the method, the water and the non-polar solvent is phase-separated from the solution containing carbon nanotubes, viologen, water and non-polar solvent, and the carbon nanotubes are divided into metallic carbon nanotubes and semi-conducting nanotubes. The water associated with the metallic carbon nanotubes can be separated from the non-polar solvent that is associated with the semi-conducting nanotubes using filtration, decantation, etc. After the water associated with the metallic carbon nanotubes is separated from the non-polar solvent that is associated with the semi-conducting nanotubes, the metallic and semi-conducting carbon nanotubes can be recovered. The method can further comprise a step of collecting semiconducting carbon nanotubes from the water and metallic carbon nanotubes from the non-polar solvent after the phase separation.

In this embodiment, the solution is prepared by mixing a solution of carbon nanotubes and water (polar solvent) or non-polar solvent with a solution of viologen and non-polar solvent or water (polar solvent). In other words, when the solution of carbon nanotubes is an aqueous solution, the viologen solution may be a non-polar solution. When the solution of carbon nanotubes is a non-polar solution, the viologen solution may be an aqueous solution. Alternatively, the solution can be prepared by adding carbon nanotubes and viologen to a solution of water and non-polar solvent.

In one embodiment, a composition for separating carbon nanotubes at least into metallic carbon nanotubes and semiconducting carbon nanotubes comprises a solution containing water (polar solvent), non-polar solvent, viologen and carbon nanotubes.

In this embodiment, the carbon nanotubes and the viologen are contained in a mixing weight ratio of about 1:0.1 to about 1:5. When an amount of the viologen is less than the range of the mixing weight ratio, an appropriate separation effect of the carbon nanotubes cannot be obtained. When an amount of the viologen is more than the range of the mixing ratio, the selectivity by the viologen can be decreased, so that a separation effect may be decreased. A mixing ratio of the water and the non-polar solvent may be arbitrarily selected.

According to an embodiment of the invention, a method of dispersing carbon nanotubes can comprise a step of making a solution containing viologen, carbon nanotubes and a solvent. Here, the solvent includes water (polar solvent) and a non-polar solvent.

In an embodiment, the solution can comprise viologen, semiconducting carbon nanotubes and water (polar solvent). Further, the solution can comprise viologen, metallic carbon nanotubes and non-polar solvent.

According to an embodiment of the invention, a composition for dispersing carbon nanotubes comprises carbon nanotubes, viologen and either water, a non-polar solvent or a combination of water and the non-polar solvent.

In this embodiment, the carbon nanotubes and the viologen is contained in a mixing weight ratio of about 1:0.1 or more. When an amount of the viologen is less than the range of the mixing weight ratio, an appropriate dispersion effect of the carbon nanotubes can not be obtained.

The carbon nanotube can be a single-walled carbon nanotube, a double-walled carbon nanotube or a multi-walled carbon nanotube. The carbon nanotubes can be in the form of ropes.

In the embodiments described above, the non-polar solvent may be an organic solvent. The organic solvent may includes alkanes such as butane, hexane, octane and cyclohexane; an aromatic compound including toluene, dichlorobenzene and iodobenzene; glycol ethers including ethylene glycol monomethyl ether and triethylene glycol monoethyl ether; glycol ether acetates including propylene glycol monomethyl ether acetate (PGMEA); acetates including ethyl acetate, butoxyethoxy ethyl acetate, butyl carbitol acetate (BCA) and dihydroterpineol acetate (DHTA); a halogen compound such as chloroform, dichloroethane, dichloroethene, or the like, or a combination comprising at least one of the foregoing solvents; and a nitrogen compound such as nitromethane, nitroethane, acetonitrile and benzonitrile, or the like, or a combination comprising at least one of the foregoing solvents.

The following examples and comparison examples are for illustrative purposes only and are not intended to limit the scope of the present invention.

EXAMPLES

Preparation of an Aqueous Solution of Carbon Nanotubes

The single-walled carbon nanotubes (ASP-100E; available from Iljin Nanotech) (5 mg) was put in a 40 ml vial, into which a mixture of nitric acid and sulfuric acid (volume ratio of nitric acid to sulfuric acid is 1:3) (30 ml) was then put. Then, it was subject to a sonication process for 3 hours. Then, a solution of carbon nanotubes was put into a 50 ml conical tube, which was then centrifugally separated at 10,000 rpm for 10 minutes to obtain carbon nanotubes. The carbon nanotubes were washed with distilled water five times, which were then re-dispersed in distilled water (30 ml) to prepare an aqueous solution of the carbon nanotubes.

Mixing of an Aqueous Solution of Carbon Nanotubes and an Aqueous Solution of Viologen DBDC (1,1'-dibenzyl-4,4'-bipyridinium dichloride (Aldrich)), which is representative viologen, was dissolved in water to obtain DBDC aqueous solution having a concentration of 10 mM.

0.1 ml (example 1), 0.2 ml (example 2) and 0.5 ml (example 3) of the 10 mM DBDC aqueous solution were respectively mixed with the prepared aqueous solution of carbon nanotubes (1 ml), and then water was added such that a total volume was 3 ml.

In addition, 0.1 ml (example 4), 0.2 ml (example 5) and 0.5 ml (example 6) of the 10 mM DBDC aqueous solution were respectively mixed with the prepared aqueous solution of the carbon nanotubes (2 ml), and then water was added such that a total volume was 3 ml.

Addition of Non-Polar Solvent

Toluene (3 ml) was added to a mixture of the prepared aqueous solution of carbon nanotubes and the aqueous solution of viologen, which was then stirred for about 1 hour and then was set, so that the mixture was separated into water and toluene.

Figure 2A:
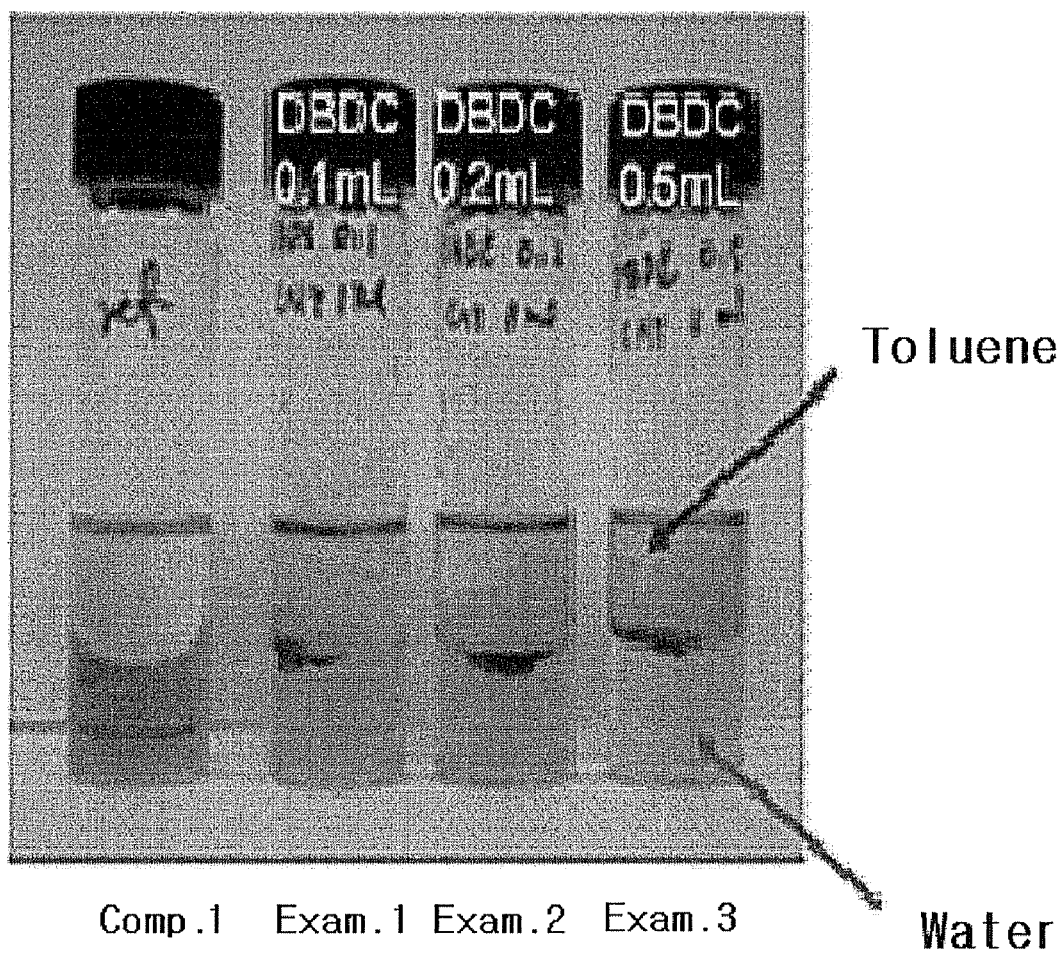
FIGS. 2a and 2b show phase separations according to concentrations of carbon nanotubes and viologen.

FIG. 2a is a photograph showing water and toluene which were separated by adding the toluene to the mixture of the aqueous solution of carbon nanotubes (1 ml) and the aqueous solution of viologen.

Figure 2B:
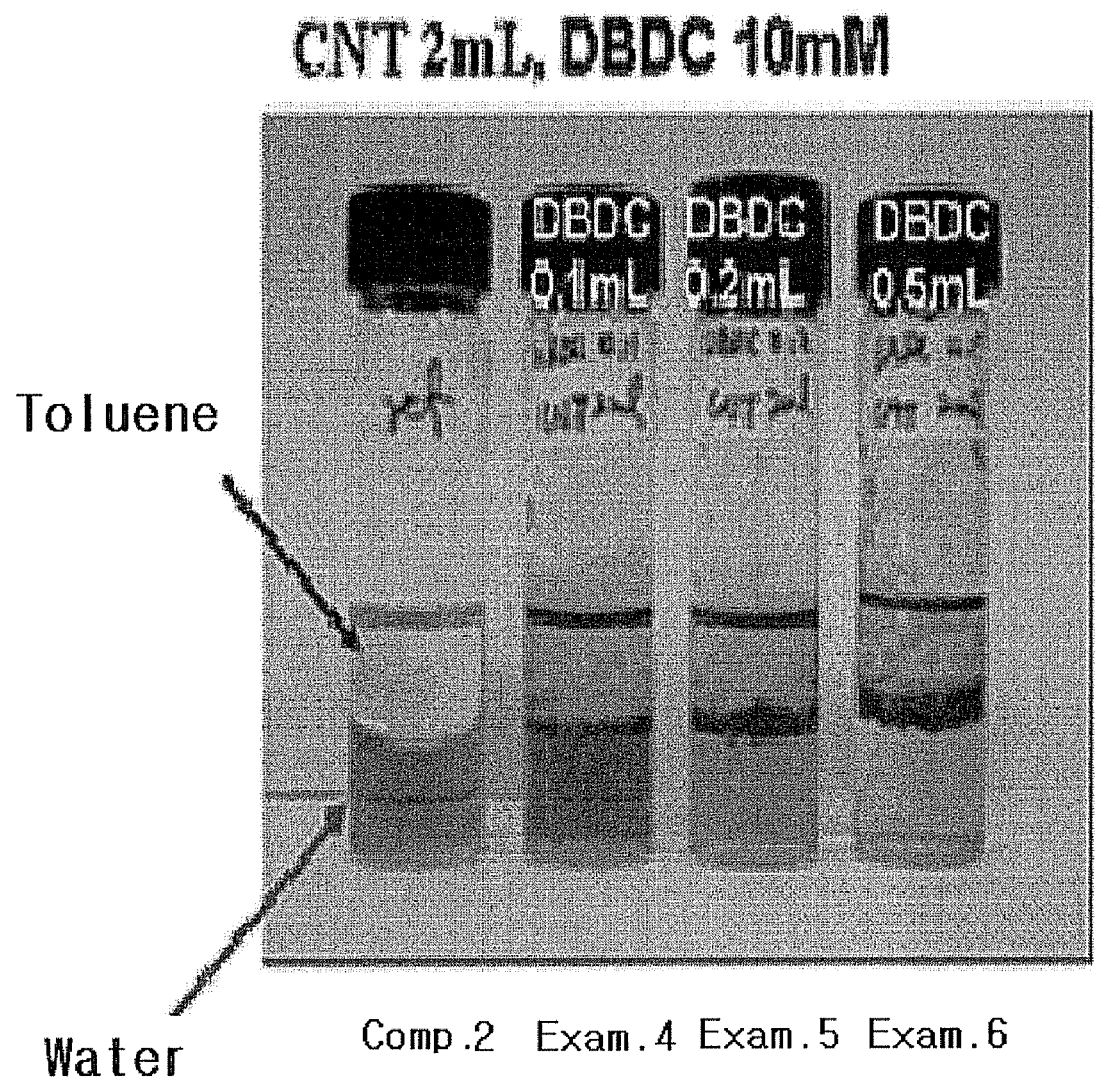

FIG. 2b is a photograph showing water and toluene which were separated by adding the toluene to the mixture of the aqueous solution of carbon nanotubes (2 ml) and the aqueous solution of viologen.

In FIGS. 2a and 2b, the first vial shows a comparison example in which the aqueous solution of viologen was not added. The comparison example 1 in FIG. 2a used 1 ml of the CNT solution and the comparison example 2 in FIG. 2b used 2 ml of the CNT solution.

As can be seen from FIGS. 2a and 2b, in case that the amount of the viologen solution was 0.1 ml and 0.2 ml respectively, the carbon nanotubes were present in both water and toluene (examples 1, 2, 4 and 5). However, in case that the amount of the viologen was increased beyond the mixing weight ratio 1:1.5 of the viologen with the carbon nanotubes, both the metallic carbon nanotubes and the semiconducting carbon nanotubes were moved to the toluene without incurring the selective separation, as shown in the examples 3 and 6 of FIGS. 2a and 2b.

Figure 3:
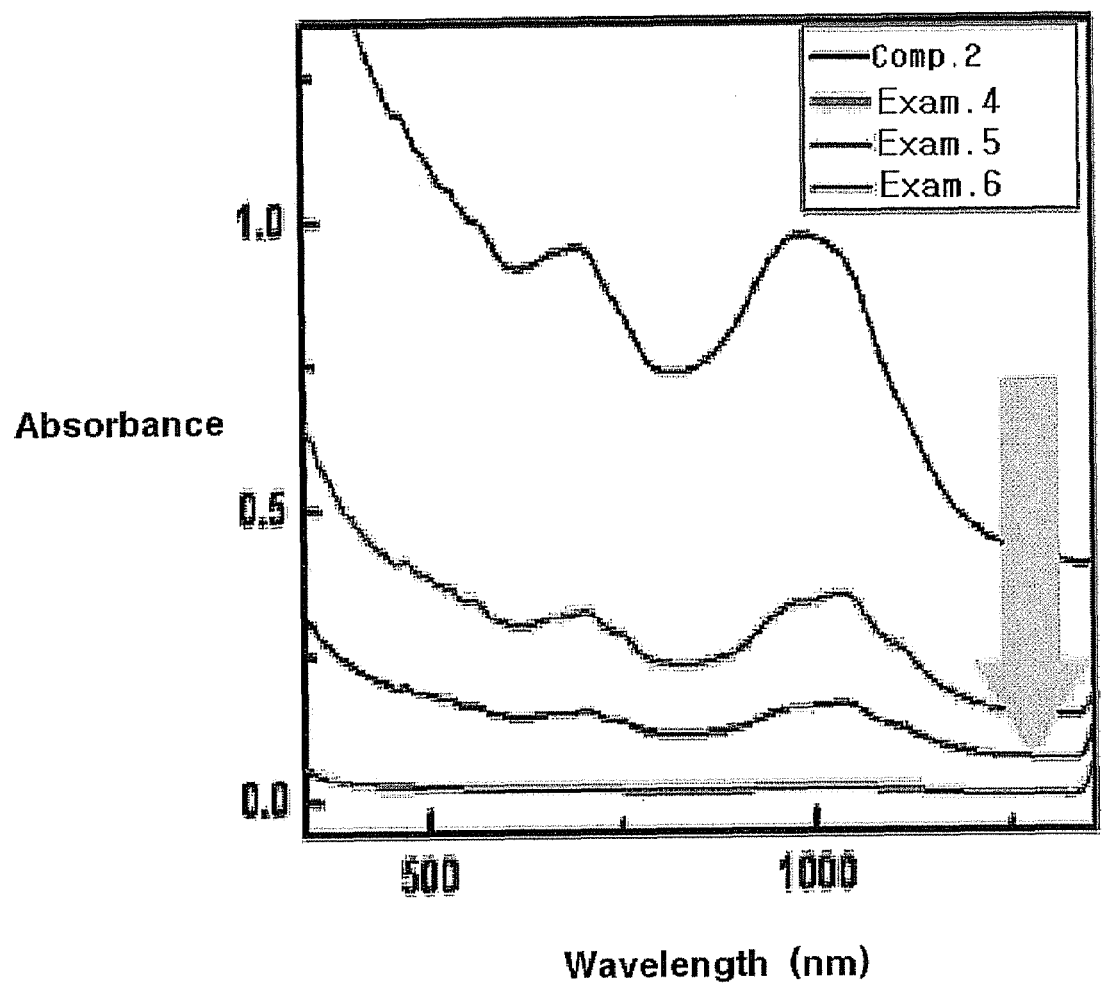
FIGS. 3 and 4 are graphs showing UV-Vis-NIR absorbance results for carbon nanotubes in water.

FIG. 3 is a graph showing UV-Vis-NIR absorbance results for carbon nanotubes in water. FIG. 3 shows that the more the amount of the viologen, the less the absorbance of the carbon nanotubes in water. In case that the amount of the viologen is increased to a predetermined level or more, the selectivity of the viologen can disappear so that the carbon nanotubes are mostly moved into toluene, thereby decreasing the absorbance.

Analysis of the Carbon Nanotubes in Water

UV-Vis-NIR absorbance was measured for the carbon nanotubes in water after the phase separation.

Figure 4:
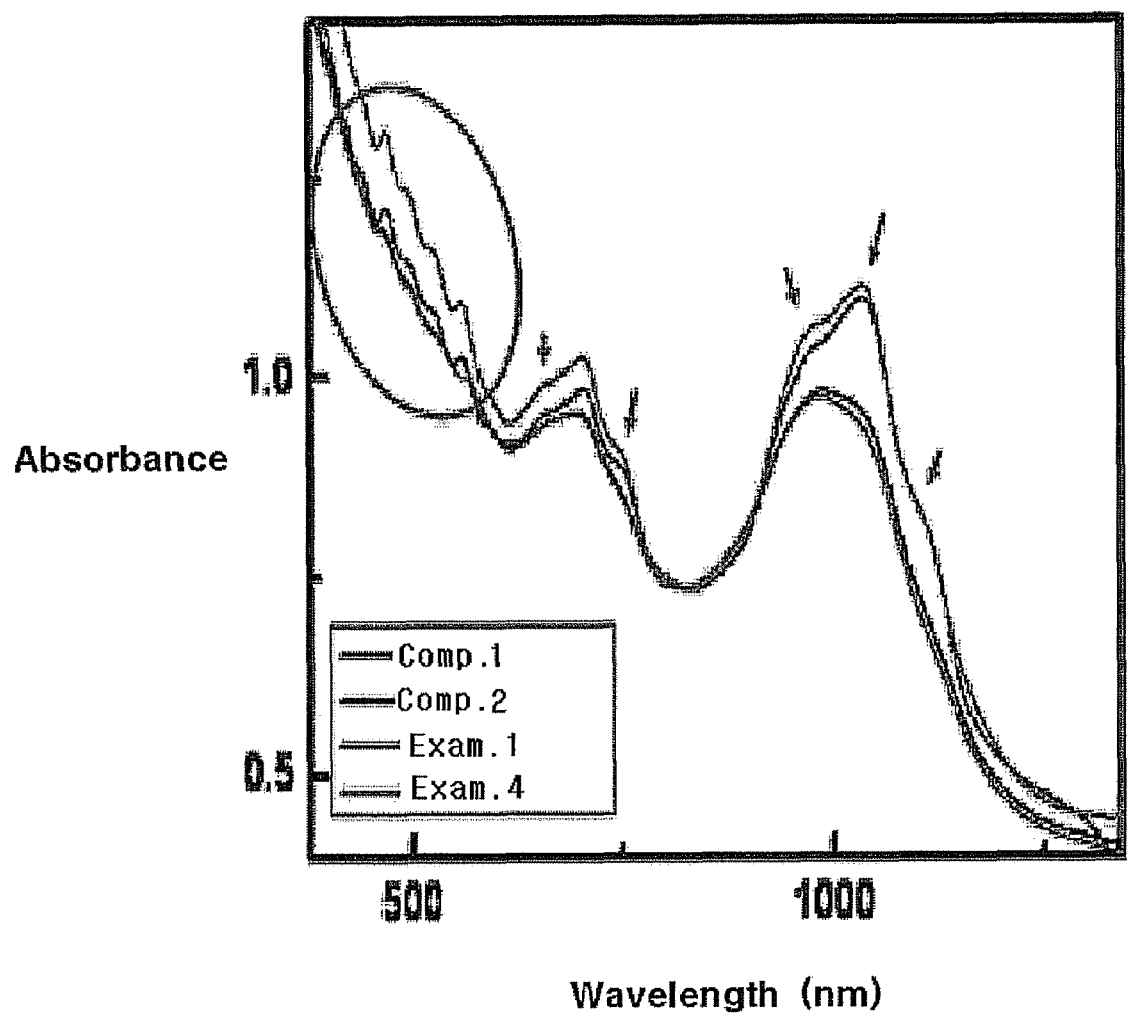

FIG. 4 is a graph showing a UV-Vis-NIR absorbance result for the carbon nanotubes in water.

As can be seen from FIG. 4, the carbon nanotubes in water in which case the viologen was added exhibited sub-bands. The sub-bands were not seen in the case where the carbon nanotubes were acid-treated in the step of preparing the aqueous solution of the carbon nanotubes. This means that the degree of dispersion of the carbon nanotubes was increased due to the viologen.

Figure 5A:
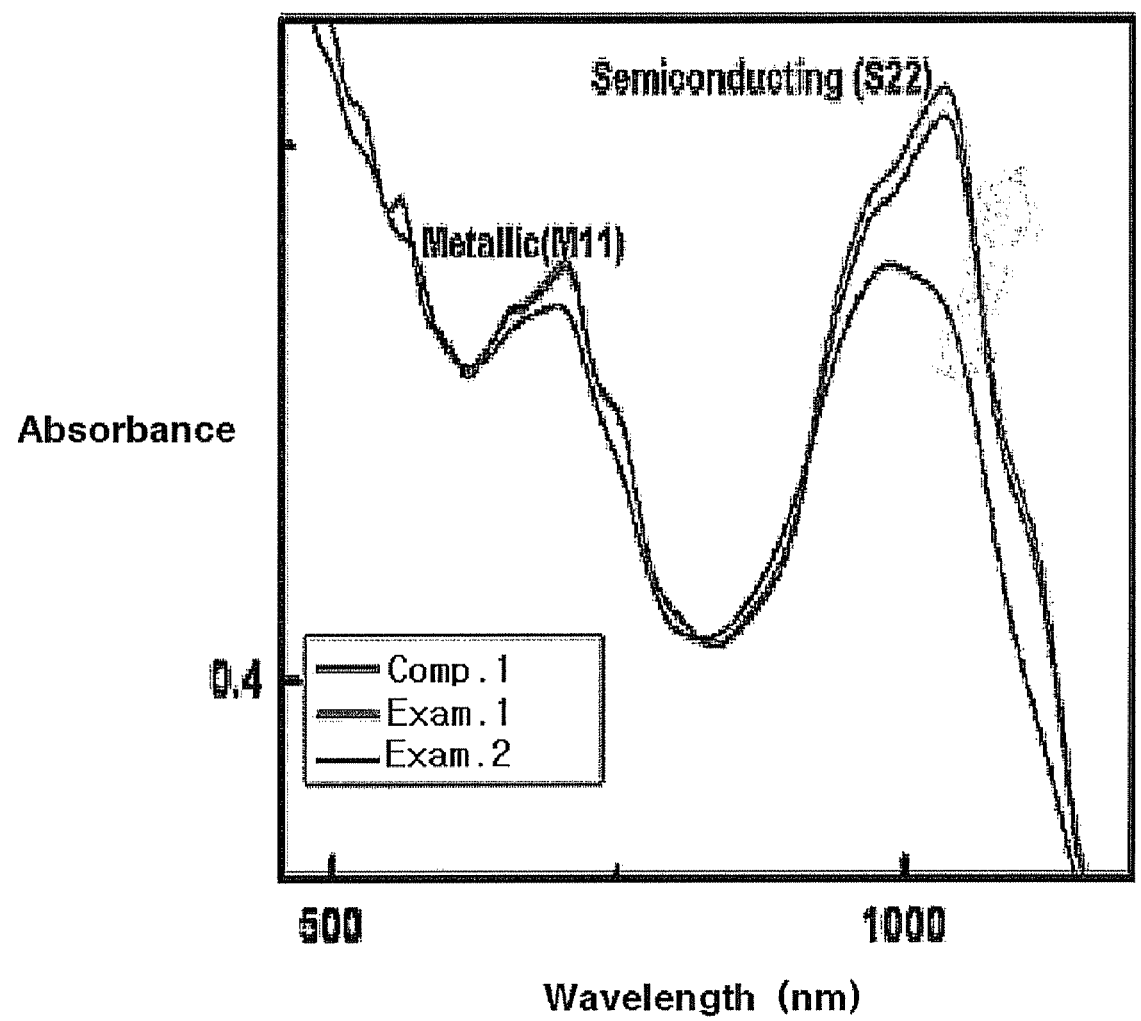
FIG. 5a is a graph showing UV-Vis-NIR absorbance for carbon nanotubes in water.
Figure 5B:
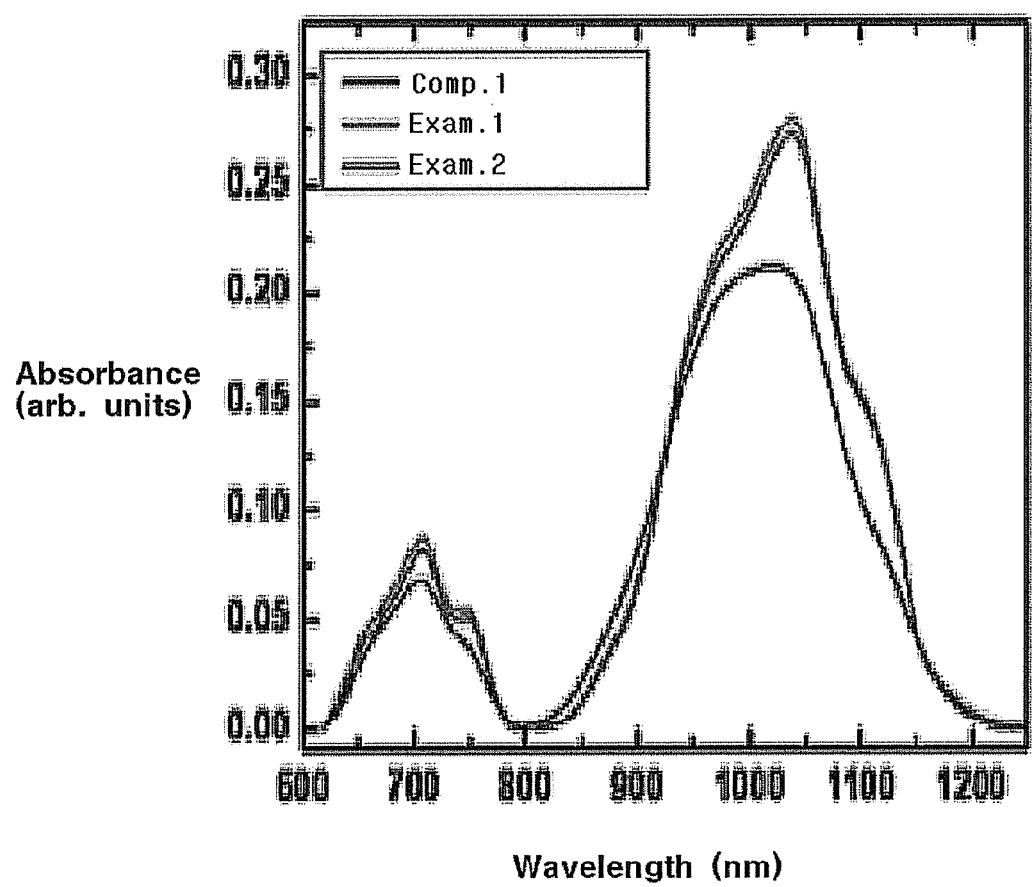

FIG. 5a is a graph showing UV-Vis-NIR absorbance for the carbon nanotubes in water, and FIG. 5b is a graph in which background values are removed in the UV-Vis-NIR spectrum of FIG. 5a.

As can be seen from FIGS. 5a and 5b, the absorbance of the semiconducting carbon nanotubes was increased for the carbon nanotubes in water, in which case the viologen was added. This means that the amount of the semiconducting carbon nanotubes separated into water was increased.

The area ratios of M11 to S22 in FIG. 5a are shown in a table 1. As shown in the FIG. 5b, after correcting the background, M11 and S22 were respectively measured from the areas of the peak (~600 nm) which represents M11 state and the peak (~1100 nm) which represents S22 state.

As can be seen from the table 1, the metallic carbon nanotubes in water were decreased by about 6%.

TABLE 1

| | M11 | S22 | M11/(S22 + M11) | Decrease ratio |
|---|---|---|---|---|
| Comparative example 1 in which CNT 1 ml was added | 6.81 | 41.58 | 0.1407 | |
| Example 1 (CNT 1 ml + Viologen 0.1 ml) | 7.48 | 49.25 | 0.1318 | −6.31% |
| Example 2 (CNT 1 ml + Viologen 0.2 ml) | 7.30 | 47.84 | 0.1324 | −5.92% |

While disclosed embodiments have been shown and described with reference to exemplary embodiments thereof, it will be understood by those of ordinary skill in the art that various changes in form and details may be made therein without departing from the spirit and scope of the present invention as defined by the following claims.

In addition, many modifications can be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguished one element from another. Furthermore, the use of the terms a, an, etc. do not denote a limitation of quantity, but rather denote the presence of at least one of the referenced item.

What is claimed is:

1. A method for separating carbon nanotubes into metallic carbon nanotubes and semiconducting carbon nanotubes, comprising:
   forming a solution comprising viologen, carbon nanotubes, water and a non-polar solvent;
   performing a phase separation on the solution comprising viologen, carbon nanotubes, water and a non-polar solvent,
   wherein the water and the non-polar solvent are phase-separated from the solution of carbon nanotubes, viologen, water and non-polar solvent, thereby separating the carbon nanotubes into metallic carbon nanotubes and semiconducting carbon nanotubes.

2. The method according to claim 1, wherein the metallic carbon nanotubes are phase-separated in the non-polar solvent and the semiconducting carbon nanotubes are phase-separated in water.

3. The method according to claim 2, further comprising collecting the metallic carbon nanotubes from the non-polar solvent and collecting the semiconducting carbon nanotubes from water.

4. The method according to claim 1, wherein the non-polar solvent is an organic solvent which comprises alkanes butane, hexane, octane, cyclohexane, aromatic solvents, toluene, dichlorobenzene, iodobenzene, glycol ethers, ethylene glycol monomethyl ether, triethylene glycol monoethyl ether, glycol ether acetates, propylene glycol monomethyl ether acetate, acetates, ethyl acetate, butoxyethoxy ethyl acetate, butyl carbitol acetate, dihydroterpineol acetate, halogen compounds chloroform, dichloroethane, dichloroethene, nitrogen compounds, nitromethane, nitroethane, acetonitrile, benzonitrile, or a combination comprising at least one of the foregoing solvents.

5. The method according to claim 1, wherein the carbon nanotubes and the viologen are contained in a mixing weight ratio of about 1:01 to about 1:5.

6. A method of dispersing carbon nanotubes, comprising:
   mixing a solution containing viologen, carbon nanotubes and a solvent comprising water, a non-polar solvent or a combination of water and the non-polar solvent.

7. The method according to claim 6, wherein the carbon nanotubes and the viologen are contained in a mixing weight ratio of about 1:0.1 or more.

8. The method according to claim 6, wherein the non-polar solvent is an organic solvent which comprises alkanes butane, hexane, octane, cyclohexane, aromatic solvents, toluene, dichlorobenzene, iodobenzene, glycol ethers, ethylene glycol monomethyl ether, triethylene glycol monoethyl ether, glycol ether acetates, propylene glycol monomethyl ether acetate, acetates, ethyl acetate, butoxyethoxy ethyl acetate, butyl carbitol acetate, dihydroterpineol acetate, halogen compounds chloroform, dichloroethane, dichloroethene, nitrogen compounds, nitromethane, nitroethane, acetonitrile, benzonitrile, or a combination comprising at least one of the foregoing solvents.

9. A composition comprising a solution of viologen, carbon nanotubes, and a solvent comprising water, a non-polar solvent or a combination of water and the non-polar solvent.

10. The composition according to claim 9, wherein the carbon nanotubes and the viologen are contained in a mixing weight ratio of about 1:0.1 to about 1:5.

11. The composition according to claim 9, wherein the carbon nanotubes and the viologen are contained in a mixing weight ratio of about 1:0.1 or more.

12. The composition according to claim 9, wherein the non-polar solvent is an organic solvent which comprises alkanes butane, hexane, octane, cyclohexane; aromatic solvents, toluene, dichlorobenzene, iodobenzene, glycol ethers, ethylene glycol monomethyl ether, triethylene glycol monoethyl ether, glycol ether acetates, propylene glycol monomethyl ether acetate, acetates, ethyl acetate, butoxyethoxy ethyl acetate, butyl carbitol acetate, dihydroterpineol acetate, halogen compounds chloroform, dichloroethane, dichloroethene, nitrogen compounds, nitromethane, nitroethane, acetonitrile, benzonitrile, or a combination comprising at least one of the foregoing solvents.

13. A method for separating metallic carbon nanotubes or semiconducting carbon nanotubes from carbon nanotubes, comprising:
   mixing the carbon nanotubes with viologen and a solvent, wherein the solvent is water, a non-polar solvent, or a combination of water and the non-polar solvent;
   performing a phase separation on the solution comprising carbon nanotubes, viologen, and the solvent,
   wherein the solvent is water to separate the semiconducting from the carbon nanotubes; and wherein the solvent is a non-polar solvent to separate the metallic carbon nanotubes from the carbon nanotubes.

14. The method according to claim 13, wherein the non-polar solvent is an organic solvent which comprises alkanes butane, hexane, octane, cyclohexane; aromatic solvents, toluene, dichlorobenzene, iodobenzene, glycol ethers, ethylene glycol monomethyl ether, triethylene glycol monoethyl ether, glycol ether acetates, propylene glycol monomethyl ether acetate, acetates, ethyl acetate, butoxyethoxy ethyl acetate, butyl carbitol acetate, dihydroterpineol acetate, halogen compounds chloroform, dichloroethane, dichloroethene, nitrogen compounds, nitromethane, nitroethane, acetonitrile, benzonitrile, or a combination comprising at least one of the foregoing solvents.

15. The method according to claim 13, wherein the carbon nanotubes and the viologen are contained in a mixing weight ratio of about 1:01 to about 1:5.

* * * * *